Figure 1:
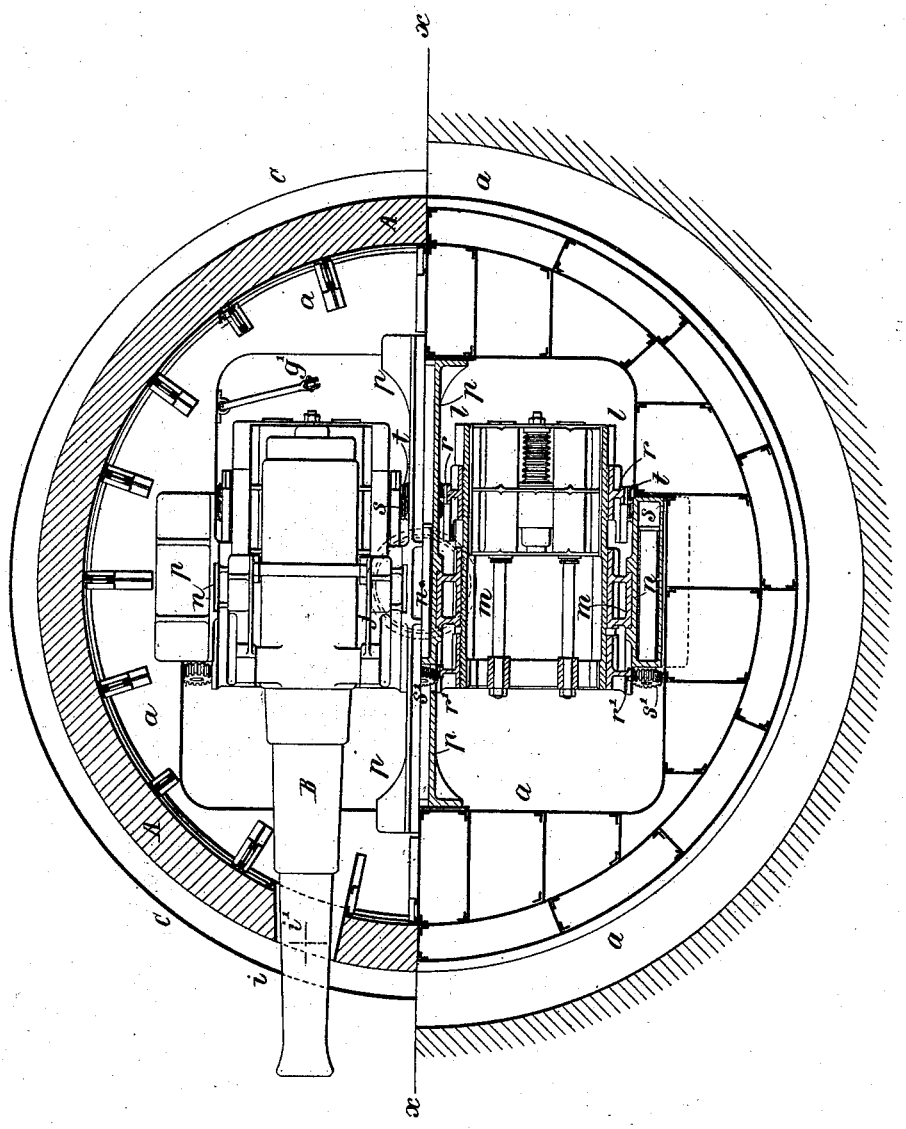

(No Model.)  11 Sheets—Sheet 1.
J. B. G. A. CANET.
MOUNTING FOR TURRET AND OTHER GUNS.

No. 474,290. Patented May 3, 1892.

Witnesses:  Inventor:

(No Model.) 11 Sheets—Sheet 2.
J. B. G. A. CANET.
MOUNTING FOR TURRET AND OTHER GUNS.
No. 474,290. Patented May 3, 1892.
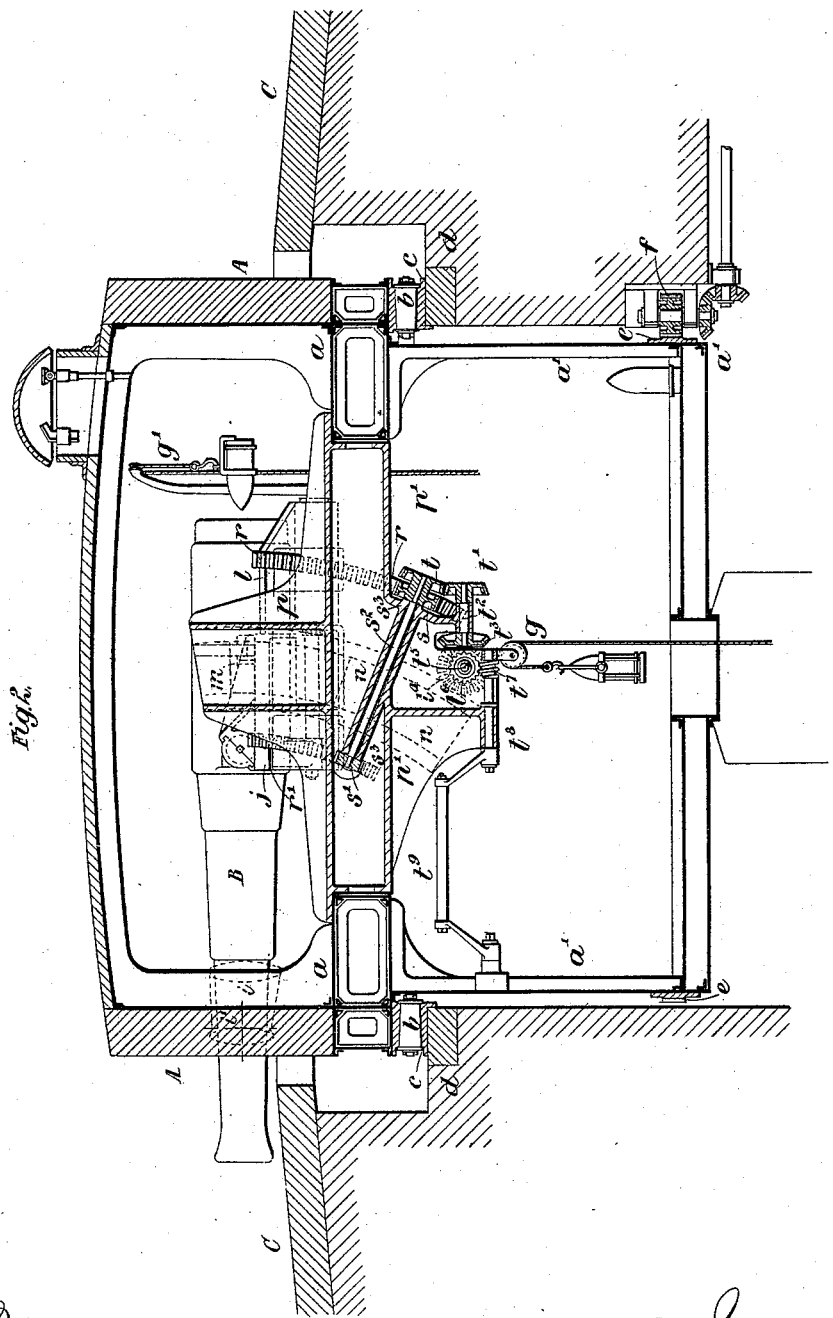

(No Model.)  11 Sheets—Sheet 3.
J. B. G. A. CANET.
MOUNTING FOR TURRET AND OTHER GUNS.
No. 474,290. Patented May 3, 1892.
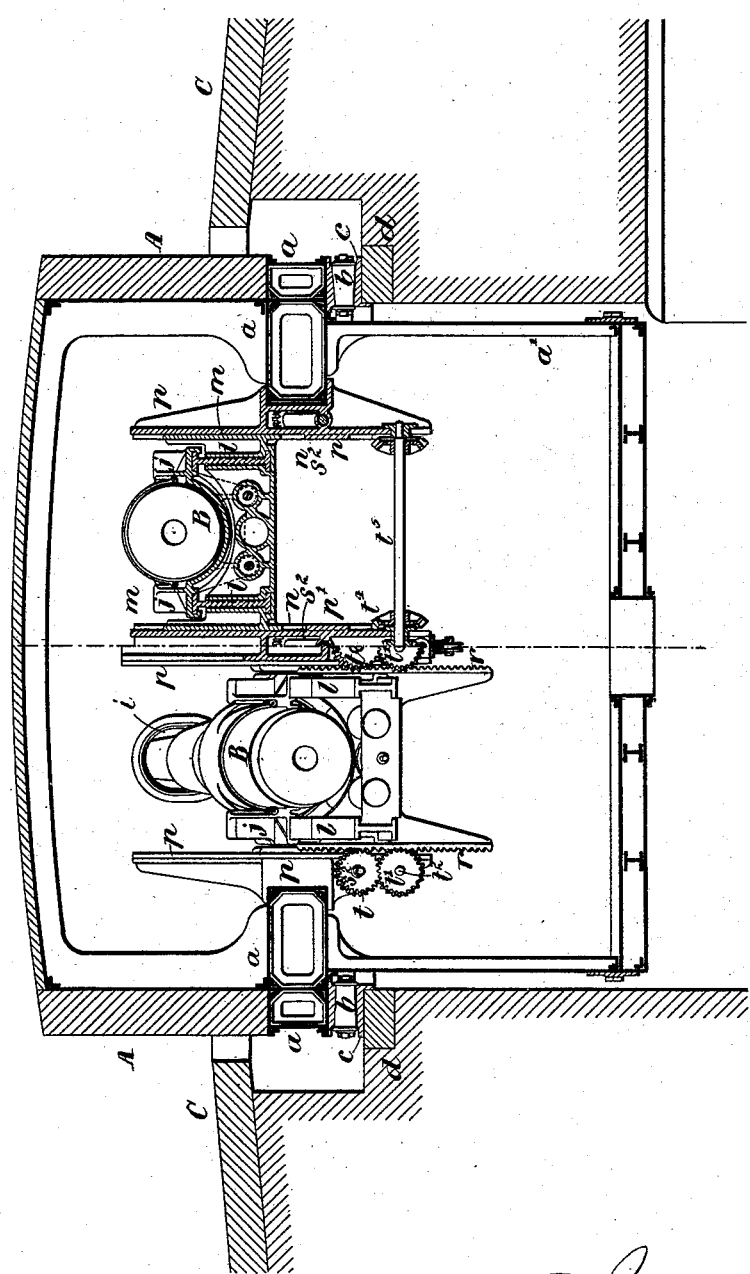

(No Model.)  
J. B. G. A. CANET.  
MOUNTING FOR TURRET AND OTHER GUNS.
No. 474,290. Patented May 3, 1892.
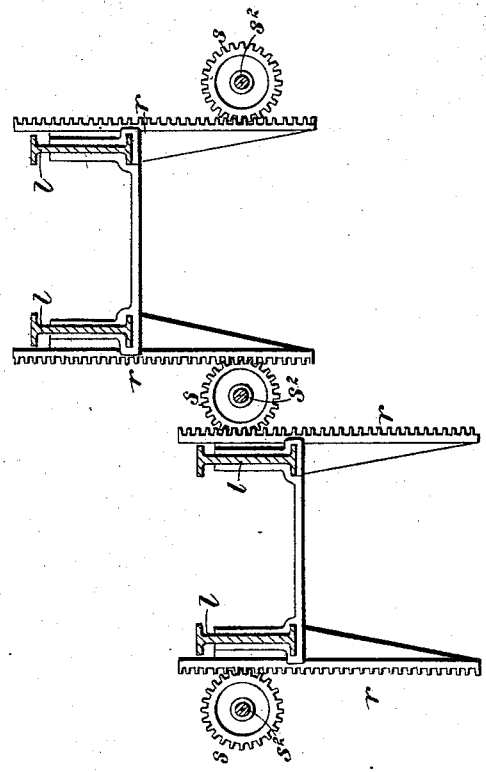

(No Model.)
J. B. G. A. CANET.
MOUNTING FOR TURRET AND OTHER GUNS.
No. 474,290. Patented May 3, 1892.
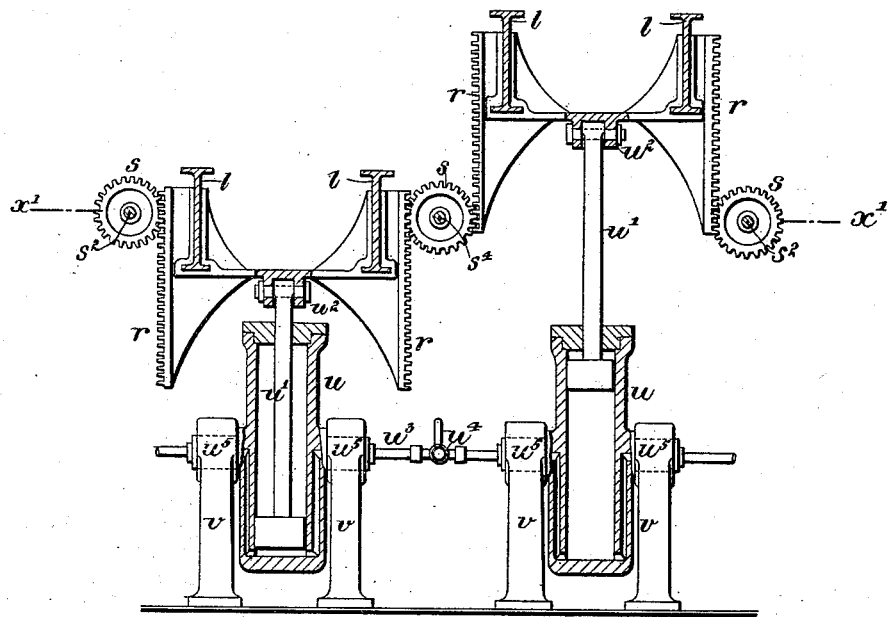
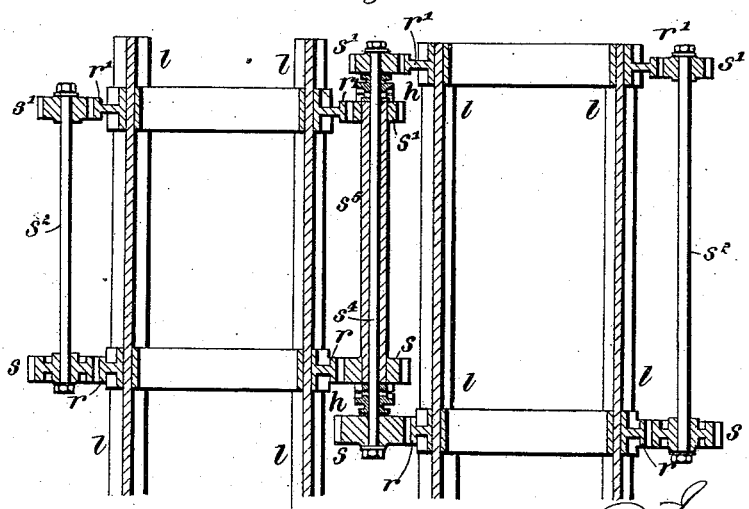

(No Model.) 11 Sheets—Sheet 9.

J. B. G. A. CANET.
MOUNTING FOR TURRET AND OTHER GUNS.

No. 474,290. Patented May 3, 1892.

(No Model.)  11 Sheets—Sheet 11.

J. B. G. A. CANET.
MOUNTING FOR TURRET AND OTHER GUNS.

No. 474,290. Patented May 3, 1892.

UNITED STATES PATENT OFFICE.

JEAN BAPTISTE GUSTAVE ADOLPHE CANET, OF PARIS, FRANCE, ASSIGNOR OF ONE-HALF TO THE SIR JOSEPH WHITWORTH & COMPANY, LIMITED, OF OPENSHAW, ENGLAND.

MOUNTING FOR TURRET AND OTHER GUNS.

SPECIFICATION forming part of Letters Patent No. 474,290, dated May 3, 1892.

Application filed June 25, 1889. Serial No. 315,529. (No model.) Patented in France July 15, 1885, No. 170,123, and July 11, 1887, No. 184,711, and in England February 21, 1888, No. 2,569, and July 28, 1888, No. 10,905.

*To all whom it may concern:*

Be it known that I, JEAN BAPTISTE GUSTAVE ADOLPHE CANET, civil engineer, a citizen of the Republic of France, and a resident of Paris, France, have invented certain new and useful Improvements Relating to Mountings for Turret and other Guns and to Charge-Elevating Apparatus for Use in Connection Therewith, (for which I have obtained patents in Great Britain, No. 10,905, dated July 28, 1888, and No. 2,569, dated February 21, 1888, and in France, No. 170,123, dated July 15, 1885, and No. 184,711, dated July 11, 1887, and certificate of addition to No. 184,711, dated December 14, 1887,) of which the following is a specification, reference being had to the accompanying drawings.

My invention relates to carriages or mountings for turret and other guns.

My said invention is partly designed to facilitate the working of guns mounted on so-called "minimum-embrasure gun-carriages," while preserving or retaining the advantage of the gun's recoil in the line of fire at any angle of elevation. By "minimum-embrasure gun-carriages" I mean carriages or mountings which are used with small embrasures or port-holes and in which provision is made for the elevation and depression of the gun through a great angle. For this purpose I provide for the vertical adjustment of the chassis beams or slides about an imaginary or virtual pivot or axis in or near the center of the embrasure or port-hole, and preferably intersecting the longitudinal axis of the gun.

I am aware that gun-mountings have been heretofore devised in which the gun is arranged to turn about an imaginary pivot or axis in the port-hole or embrasure; but in such mountings the chassis or part upon which the gun recoils is not arranged to turn with the gun about the said pivot or axis; therefore the gun can only recoil in the line of fire when it is at such an angle of elevation that this line is parallel with the said chassis or part.

I am also aware that gun-mountings have been constructed with pivoted beams or gun-slides, upon which the gun will at any angle of elevation recoil in the line of fire; but I am not aware that any mounting has ever been devised or constructed in such a manner that the pivot or axis about which the gun-slides turn for vertical pointing or elevation is within the port-hole or embrasure. I combine with the chassis beams or slides segmental or arc-shaped guides, which control the movement thereof with the gun about the imaginary or virtual pivot for vertical pointing or elevation, so that at an elevation the line of fire will be parallel to the surface on which the gun slides.

My said invention, moreover, comprises a novel manner of mounting two-port pivot-gun slides side by side, so that with their guns they will counterbalance each other, and their vertical adjustment can be expeditiously effected with a slight expenditure of power.

My said invention also comprises other improvements, hereinafter set forth.

In the accompanying drawings I have shown how my said invention may be conveniently and advantageously carried into practice.

Figure 7:
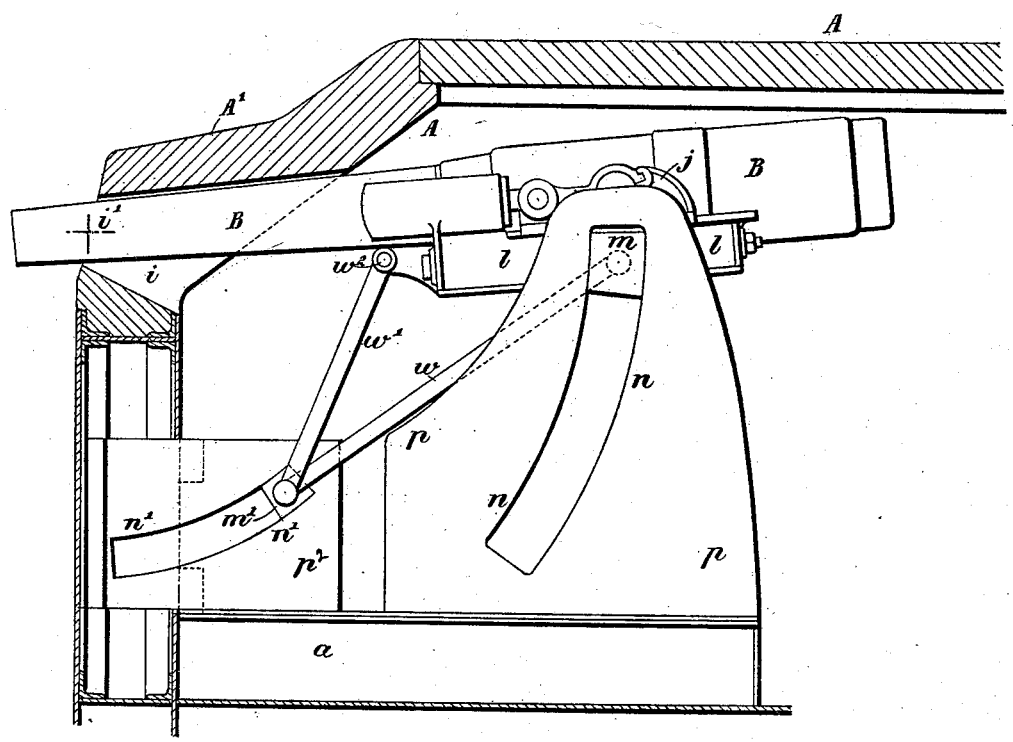
Figure 8:
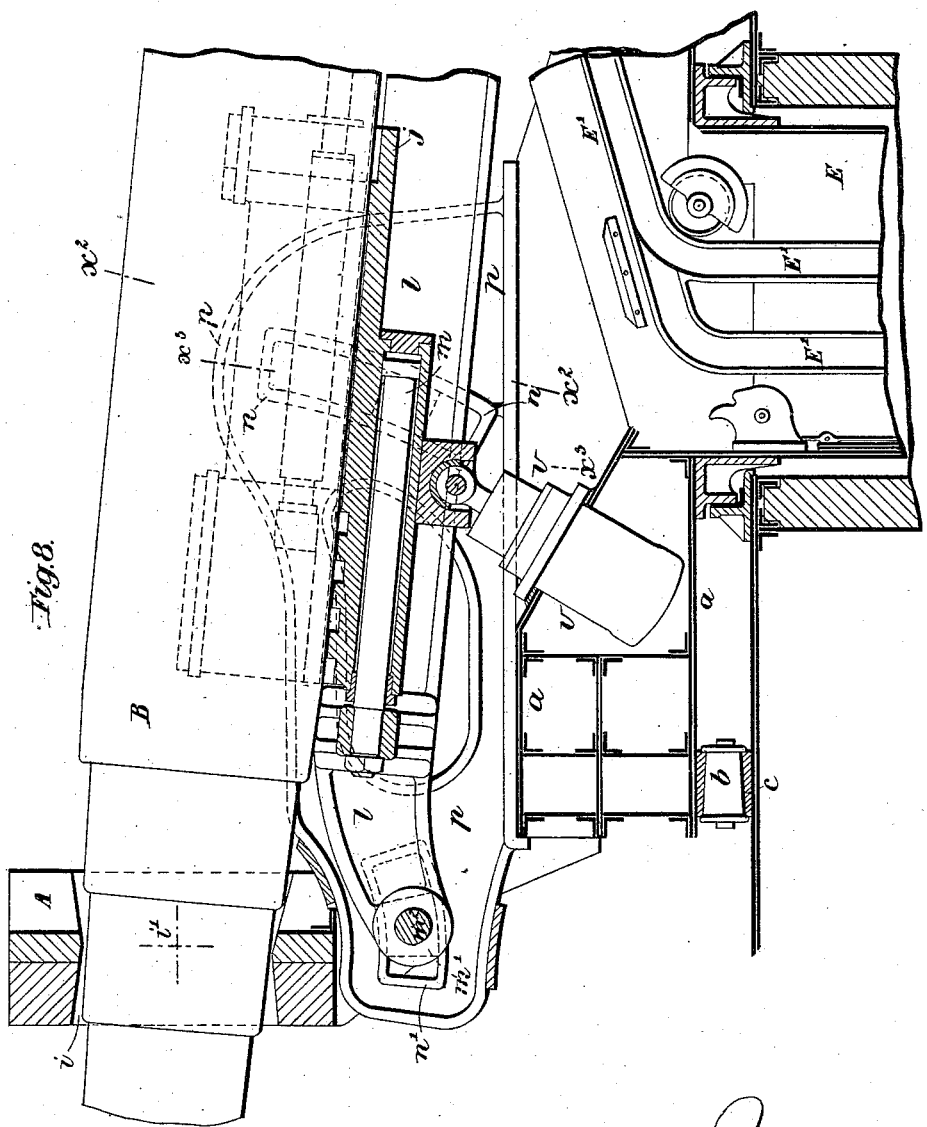
Figure 9:
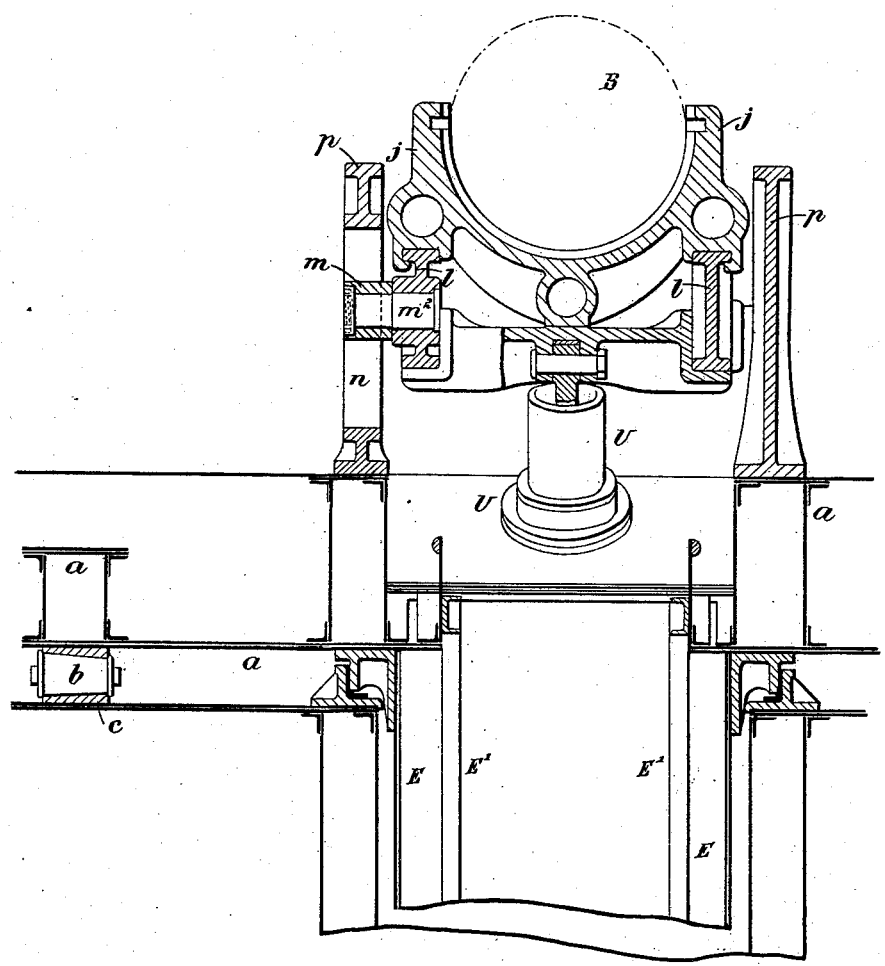
Figure 10:
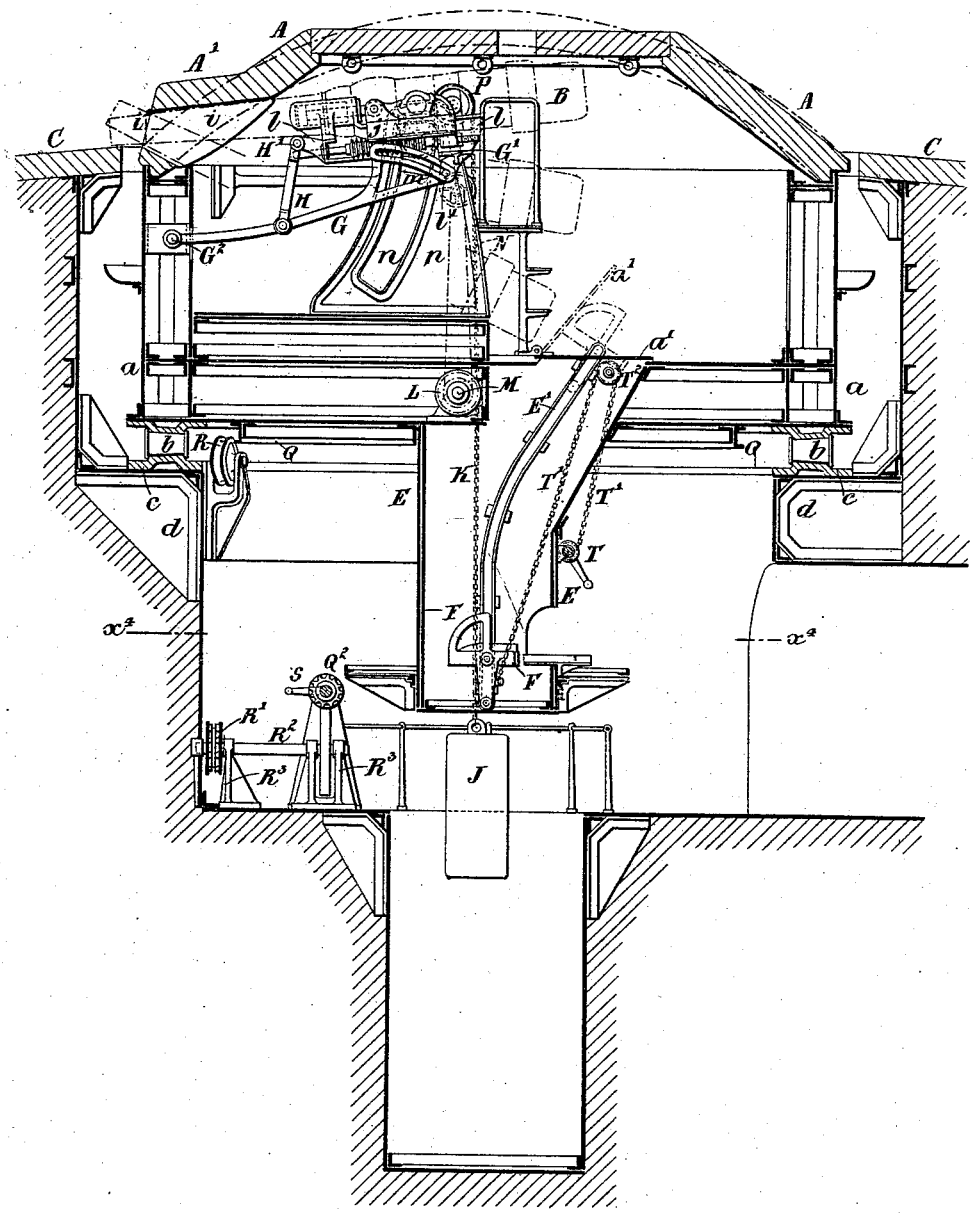
Figure 11:
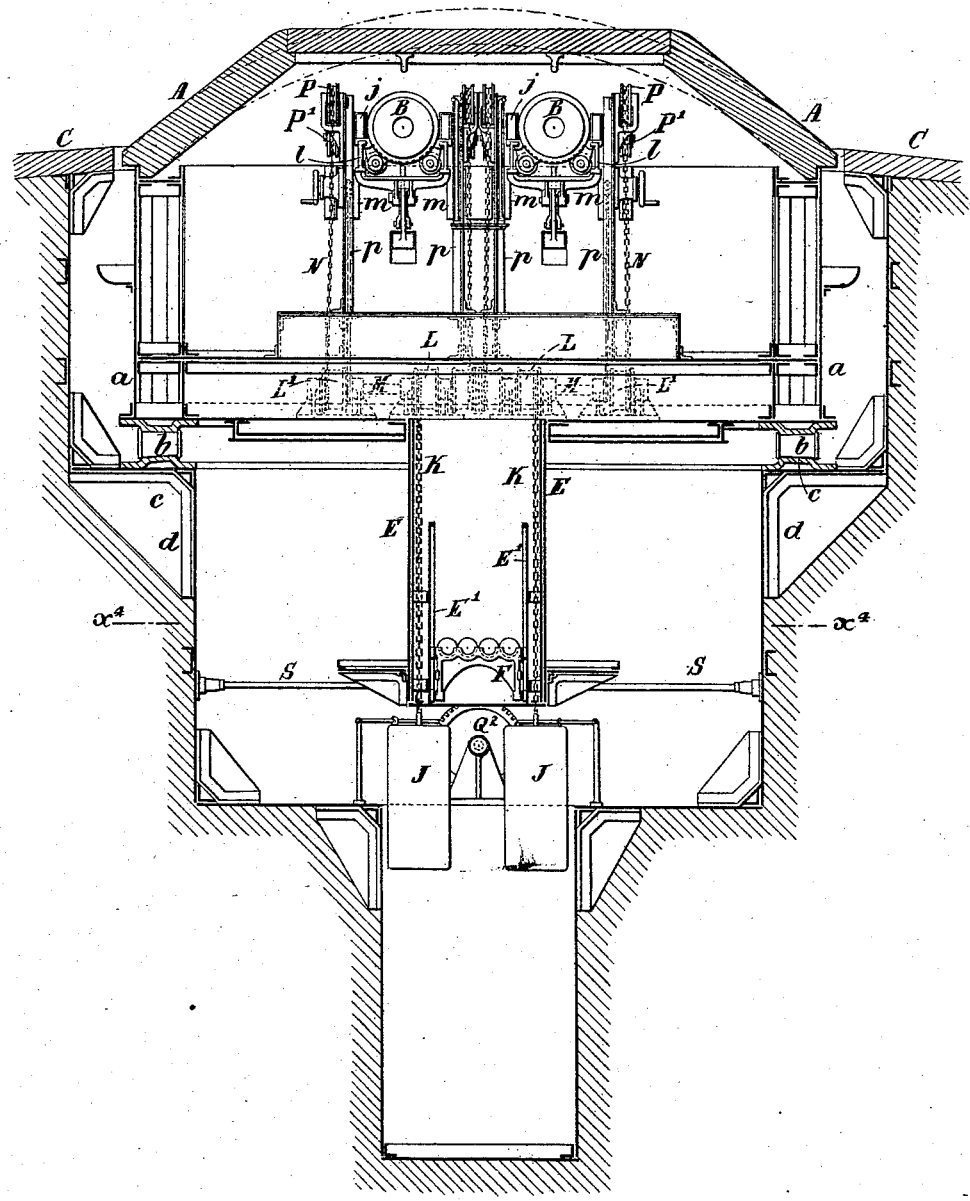
Figure 12:
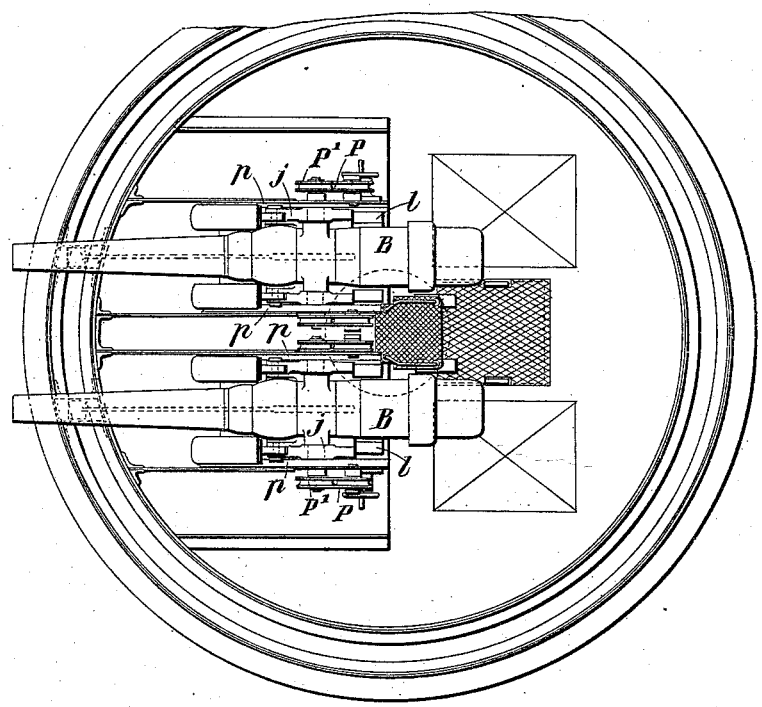
Figure 13:
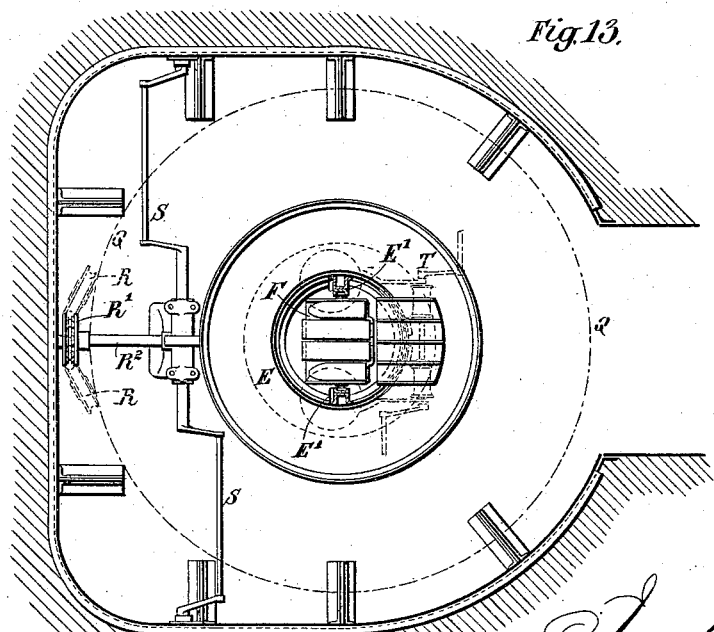

Figure 1 is a plan, partly in section, showing my improvements applied to a turret armed with two guns. Fig. 2 is a vertical central section on the line $xx$, Fig. 1. Fig. 3 is a central transverse section, some of the parts being shown in rear elevation. Fig. 4 is a sectional rear elevation showing details of construction hereinafter described. Fig. 5 is a sectional rear elevation; and Fig. 6, a horizontal section on the line $x'\ x'$, Fig. 5, illustrating a modification of my invention hereinafter described. Fig. 7 is a sectional side elevation illustrating my improvements applied to a mounting for a single gun. Fig. 8 is a sectional side elevation; Fig. 9, a transverse section on the lines $x^2\ x^2$ and $x^3\ x^3$, Fig. 8, illustrating another modification of my said invention. Fig. 10 is a vertical longitudinal central section, some of the parts being shown in side elevation; and Fig. 11 a central transverse section, some of the parts being shown in rear elevation, illustrating a further modification of my said invention. Fig. 12 is a plan of the mounting shown in Figs. 10 and 11, the top of the turret being removed; and Fig. 13 is a horizontal section on the line $x^4$ $x^4$, Figs. 10 and 11.

Like letters indicate corresponding parts throughout the drawings.

A is the turret.

B B are the guns.

C is the glacis.

The armored turret is carried by a rotating platform or turn-table $a$, which is supported, through the medium of a live ring of rollers $b$, upon a racer or roller path $c$, fixed upon a suitable foundation $d$.

In the arrangement shown in Figs. 1 to 4 rotary motion is imparted to the turret A by means of a circular rack $e$, firmly fixed on the part $a'$ of the turn-table $a$. The rack $e$ has geared with it a pinion $f$, which is driven by power applied through suitable gearing arranged in the substructure.

Hoisting-tackle, as at $g$ $g'$, or other convenient means at the center or side of the mounting are provided for bringing the ammunition from a magazine into position for being rammed into the gun.

The guns B are mounted side by side in the turret and participate in the rotary movement of the said turret. They are arranged to fire through port-holes or embrasures $i$, the diameter of which is but slightly greater than that of the chase of the gun. Each gun B is supported in a cradle or top carriage $j$, which is arranged to recoil with the gun against the resistance of suitable hydraulic brakes upon the chassis slides or beams $l$. Recuperator apparatus of any suitable description is or may be combined with the said brakes, for the purpose of automatically effecting the running out or return of the gun after each discharge.

As hereinbefore stated, I provide for the vertical adjustment or elevation of each of the guns by displacement thereof with the chassis beams or slides about the imaginary or virtual pivot—that is to say, the gun and the part on which it slides in its recoil, though not provided with an actual or material pivot, are guided in their vertical movement by arc-shaped surfaces, so that they turn about an axis in or near the port-hole or embrasure or intersecting the chase of the gun.

Each of the guns shown has its imaginary pivot or axis at a point indicated by the intersection of the lines $i'$ within its port-hole or embrasure $i$, and is turned about the same in the raising and lowering of the gun for vertical pointing or elevation or for bringing the gun to the loading position. For this purpose I employ the following mechanism—that is to say: The beams or gun-slides $l$ are provided with slide-blocks $m$, arranged to work in segmental or arc-shaped grooves or guides $n$, formed with or rigidly attached to vertical cheeks or side frames $p$, which form part of or are firmly secured to the rotating platform or turn-table $a$. The curved surfaces of the grooves or guides $n$ are arcs of circles having their common center in the imaginary pivot or axis at $i'$.

The movement of the guns about the imaginary pivot or axis is effected by means of segmental racks $r$ $r'$, firmly attached to the beams or gun-slides $l$ and concentric with the grooves or guides $n$. These racks are geared with conical pinions $s$ $s'$, fixed upon shafts $s^2$, which are supported in suitable bearings $s^3$, attached to a cross-beam or girder $p'$, formed with the central cheek or frame $p$. The diameters of the said pinions $s$ $s'$ are proportional to their distances from the imaginary pivot or axis at $i'$.

Suitable gearing is provided for connecting the shaft $s^2$ with hydraulic or other apparatus for imparting rotary motion to the said shaft.

In the arrangement shown in Figs. 1 to 4 there is fixed on each of the shafts $s^2$ a bevel-wheel $t$ geared with another bevel-wheel $t'$, fixed upon a shaft $t^2$, which is connected by means of bevel-wheels $t^3$ $t^4$ with a shaft $t^5$. A worm-wheel $t^6$ is fixed on the said shaft $t^5$, and with this worm-wheel is geared a worm or endless screw $t^7$, fixed upon a shaft $t^8$, provided with a crank-handle $t^9$, whereby it may be rotated by manual power. This crank-handle can be rotated for the purpose of elevating and depressing the guns by one or more men standing within the chamber $a'$ beneath the platform or turn-table $a$, and as this chamber is secured to or forms an extension of the said platform or turn-table it is obvious that the elevation or depression of the gun can, if desired, be effected during the training thereof. The segmental racks $r$ $r'$ on the inner beam or slide $l$ of one mounting are geared with those on the inner beam or slide $l$ of the other mounting by means of the corresponding conical pinions $s$ $s'$, there being only one set of these pinions $s$ $s'$ between the two sets or pairs of racks $r$ $r'$. The loads carried by these sets of racks are equal or about equal, and as they tend to turn the shaft $s^2$ in opposite directions it follows that the guns counterbalance each other in respect of their action upon the said shaft, so that for rotating the shaft to turn the guns about their imaginary pivots or axes only the resistance due to friction has to be overcome. The guns can therefore be quickly elevated or depressed with a slight expenditure of power.

By the arrangement of the guns and their mountings and the minimizing of the dimensions of the embrasures, as above described, I am enabled in a very convenient manner, while affording adequate protection to the said guns and their mountings, to allow the guns to be adjusted through an extended vertical field of fire.

Figs. 5 and 6 show a modification of my invention whereby I provide for the connection and disconnection of the guns, so that they can be worked conjointly or independently of each other, as desired. For this purpose two sets of pinions $s$ $s'$ are employed between the inner slides $l$. These pinions are fixed on two shafts $s^4$ $s^5$, which have a common axis, the shaft $s^5$ being hollow and the shaft $s^4$ extending through the said hollow shaft. The racks on one gun-mounting are, as shown, placed at a greater distance apart than those on the other mounting. A clutch $h$ or other suitable device is provided, whereby the shafts $s^4$ $s^5$ may be locked together or connected, so that when one gun is elevated the other gun will be depressed, or, as above stated, the said shafts may be disconnected when it is desired to work the guns independently of each other. When the shafts $s^4$ $s^5$ are connected, they form practically a single shaft, and the guns counterbalance each other, as hereinbefore described, so that their movement about their imaginary pivots or axes can be rapidly effected, power being applied for this purpose to the shaft $s^4$ or the shaft $s^5$.

For elevating and depressing the guns independently of each other when the said shafts are disconnected, I in some instances provide hydraulic cylinders $u$, as shown in Fig. 5. One of these cylinders is placed under each gun-mounting, and its piston-rod $u'$ is suitably connected with the mounting at $u^2$. The cylinders $u$ are connected by a pipe $u^3$, provided with a stop-cock $u^4$. The said cylinders $u$ are mounted upon trunnions $u^5$, supported in suitable bearings in standards $v$, so that the said cylinders are free to oscillate, and thus adapt themselves to the varying angle or inclination of the guns, or the said cylinders may be fixed and the pistons provided with trunks for this purpose. To permit the movement of the guns by mechanism such as I have hereinbefore described when the shafts $s^4$ $s^5$ are connected, the cock $u^4$ is opened, so as to put the cylinders $u$ in communication with each other; or I may operate the guns by means of the hydraulic apparatus, the cock $u^4$ being closed and the cylinders $u$ being alternately opened to pressure and exhaust. By the above-described arrangement, comprising the solid and hollow shafts, I am enabled to vary the elevation of the guns relatively to each other when desired.

Fig. 7 shows a mounting for a single gun, which is advantageous in cases where it is desired that the gun shall not protrude or shall protrude but a short distance through the embrasure or port-hole. In this case the gun B is mounted in a cradle or top carriage $j$, which slides upon a chassis $l$, supported on a frame constructed as follows—that is to say: The chassis $l$ is provided with suitable slide-blocks $m$, arranged to work in segmental grooves or guides $n$ in cheeks or standards $p$, firmly attached to the platform $a$. The slide-blocks $m$ are connected by means of a tie rod or bar $w$ with slide-blocks $m'$, arranged to move in segmental or arc-shaped slots or guides $n'$ in brackets $p^2$, firmly attached to the platform $a$, the said guides $n'$ being concentric with the guides $n$. In the drawings one of the brackets $p^2$ is removed. The slide-blocks $m'$ are also connected by means of a tie rod or bar $w'$ to the forward end of the chassis $l$ at $w^2$. The segmental grooves or guides $n$ $n'$ have their common center in the imaginary pivot or axis about which the gun is to turn for elevation or depression. The said frame is so constructed that when the gun is elevated or depressed the slide-blocks $m$ $m'$, the rods or bars $w$ $w'$, and the gun turn as a whole about the said imaginary pivot or axis at $i'$. I sometimes arrange in the rear guides $n$ sliding blocks similar to the blocks $m'$, with keyed or rigid tie rods or bars for sustaining the carriage, thus forming a second rigid system similar to that above described. These blocks and the blocks $m'$ are then connected by suitable rods or bars. Hydraulic or other apparatus is provided for supporting and elevating the gun and its slides. If desired, more than one tie rod or bar—such as $w$ or $w'$—may be used in the construction of the aforesaid frame.

Figs. 8 and 9 show a modification of my invention designed more especially for naval service, but also useful in other cases in which the gun protrudes a considerable distance through the embrasure or port-hole. The beams $l$ are provided with slide-blocks $m$, arranged to work in segmental guides $n$, formed in the cheeks or side frames $p$, as above described. The said beams are supported at their forward end by slide-blocks $m'$, arranged to move in segmental or arc-shaped guides $n'$, also formed in the said cheeks or side frames $p$ and concentric with the guides $n$—that is to say, the guides $n$ $n'$ have their common center in the imaginary pivot or axis at $i'$. The said beams have, however, no angular movement about the axis of the pin or bolt $m^2$, whereby they are connected with the slide-blocks $m$ $m'$. The guns and their beams or slides are guided in their vertical movement or adjustment about the imaginary pivot or axis entirely by the segmental or arc-shaped surfaces.

The beams, the cradle or top carriage, and the gun are supported by the blocks $m'$ and by a hydraulic press U, which serves for the vertical pointing or elevation of the gun. Other mechanism may, however, be used for effecting the vertical pointing or elevation. Under some circumstances it is desirable to have the slide-blocks secured to the aforesaid cheeks and the guides formed on or rigidly attached to the beams, chassis, or frame of the gun-mounting. I sometimes dispense with the rear slide-blocks $m$ and provide the aforesaid cheeks or side frames with guides or bearing-surfaces, which are concentric with the forward guides $n'$, and I so construct and arrange the beams, chassis, or frame that the rear end thereof will bear against and slide upon the said guides or bearing-surfaces, being secured against forward movement therefrom by suitable clips or otherwise. In this modification of the said invention I prefer that the forward guides should be situated between the beams.

In the modification of my invention illustrated in Figs. 10 to 13, which is more especially adapted for land service, the turret is sunk in a pit, which is in communication with the magazines by means of a subterranean passage. The platform or turn-table $a$ has firmly secured thereto a central tube E, arranged to rotate with the said platform or turn-table and provided with guides E' for controlling the movement of a charge-carrier F for raising the ammunition from the magazine into such a position that it may be rammed into the gun. The gun-slides or beams $l$ are provided with slide-blocks $m$, which move, as above described, in segmental grooves or guides $n$ in cheeks or frames $p$, firmly attached to the platform $a$, the force of the recoil being transmitted to the said cheeks or frames $p$ through the medium of the brakes and the sliding blocks $m$.

In order that the embrasure or port-hole may be made as small as practicable, I sometimes form the said embrasure in a projection A' on the armored shield, as shown in Figs. 7 and 10, and so construct the mounting that the imaginary pivot or axis of rotation for the vertical adjustment of the gun is at the outer extremity of the said embrasure and intersects the longitudinal axis of the gun. To accomplish this result in the apparatus shown in Figs. 10 to 13, an arm or lever G, provided with a segmental slot G', is coupled at $G^2$ to the turn-table or turret, and in the said slot is adapted to work a roller $l'$, fitted to rotate upon a pin or shaft carried by the gun-slides or beams $l$. This arm or lever G is coupled by means of a link H to the forward end of the gun-slides or beams $l$, as at H'. When the gun is adjusted vertically by means of the elevating mechanism, the roller $l'$, working in the slot G', depresses or raises the arm or lever G, which acts, through the medium of the link H, upon the forward end of the gun-slides or beams $l$. The curvature of the slot G' and the length and arrangement of the link H are such that in the raising and lowering of the gun the point or connection H' describes an arc of a circle concentric with the segmental guides $n$, and the movement of the gun takes place about the imaginary pivot or axis $i'$ in the port-hole or embrasure $i$. In the lower part of the aforesaid pit are arranged weights J for equilibrating or counterbalancing the guns. These weights are connected to chains K, which pass up through the central tube E and are attached to and wound upon drums L, firmly keyed upon a horizontal shaft M, carried in suitable bearings in brackets or standards firmly attached to the platform $a$. Upon this shaft M are fixed other drums L', having chains N, attached thereto and wound thereon. The chains N are passed over grooved wheels or pulleys P and under grooved wheels or pulleys P' and are secured in any convenient manner. By this arrangement when the gun is lowered the chains N will be unwound from the drums L' and the chains K will be wound upon the drums L, thus raising the counter-weights J. When the gun is raised, the contrary action will take place. The gun will therefore be equilibrated or counterbalanced in any position it may occupy, and the vertical pointing or elevation of the gun can be easily and expeditiously performed. It is obvious, however, that I can employ other suitable means for counterbalancing the gun. For instance, I can connect the two guns, as hereinbefore described, so that they will counterbalance each other. Moreover, I can employ toothed segments, hydraulic cylinders, or other suitable devices for effecting the vertical pointing or elevation of the gun or guns.

The horizontal pointing or training of the guns is effected by means of an endless chain, which is passed around a grooved cylinder or drum Q, provided upon the under side of the platform $a$, and over grooved wheels or pulleys R and around a chain-wheel R', fixed on a shaft $R^2$, carried in suitable bearings in brackets or standards $R^3$. Rotary motion may be imparted to the shaft $R^2$ through suitable gearing $Q^2$ by means of cranks S, Fig. 13, or by other suitable means, or the training may be effected in any other convenient manner, either by hand or by means of a suitable motor.

For conveying or raising the ammunition into position behind the breech of the gun I employ a charge-carrier F, which is adapted to contain two projectiles and two powder-charges, and is arranged to move in guides E' in the central tube E. The said charge-carrier is raised and lowered by means of a winch T, the chain T' of which is passed over a pulley $T^2$ and connected with the said carrier, and which is worked by hand or other suitable motive power. By these means the ammunition may be raised to the loading-platform. In some instances, however, I provide two sets of charge-carriers and accessory parts, one for each gun, in which case the ammunition may be raised into a position from which it may be rammed into the gun. The central tube E remains constantly in communication with the subterranean passage to the magazine. The loading can therefore be performed in any position of the gun and mounting.

The platform $a$ is preferably provided with a hinged door or shutter $a'$ for closing the aperture therein, through which the ammunition is raised. In this case I so construct and arrange the charge-carrier F that it will in its upward movement automatically raise and open the said door or shutter. I provide, moreover, suitable openings in the platform, which serve for the passage of the guns and parts of the mounting when the said guns are to be dismounted. It is obvious that I can further modify the construction of parts of my apparatus to adapt it for use with different forms of gun-carriages.

For raising or conveying the ammunition into position behind the breech of the gun it is advantageous, in some cases, to use apparatus similar to that described in the specification of my application for Letters Patent of the United States filed March 6, 1889, Serial No. 302,062. In such cases the rotation of the gun and turn-table may be effected through the medium of the central tube, through which the ammunition is raised. The imaginary or virtual pivot, about which the gun turns for elevation, is preferably, as above stated, within the port-hole or embrasure or within a prolongation thereof in either direction, and I prefer that it should intersect the longitudinal axis of the gun.

Although I have described my invention more particularly as applied to guns mounted on a rotating platform, it is obvious that my improvements are also applicable to guns mounted on a fixed platform or one capable of horizontal movement through but a small angle for training the gun.

My invention is advantageous in any case where the gun is to be fired through an opening in a shield.

What I claim is—

1. A gun-mounting comprising a vertically-adjustable chassis upon which the gun slides longitudinally in its recoil and running-out movements, said chassis being adjustable for vertical pointing or elevation about an imaginary or virtual pivot or axis forward of the same.

2. In a gun-mounting, the combination, with a vertically-adjustable chassis upon which the gun slides longitudinally in its recoil and running-out movements, of guides for the vertically-adjustable chassis having segmental or arc-shaped surfaces, whereby the said chassis when adjusted for vertical pointing or elevation is caused to turn about an imaginary or virtual pivot or axis, for the purpose above specified.

3. In a gun-mounting, the combination, with a vertically-adjustable chassis upon which the gun slides longitudinally in its recoil and running-out movements, of guides for the vertically-adjustable chassis, having segmental or arc-shaped surfaces, the centers of which are in a horizontal line intersecting the chase of the gun, substantially as and for the purpose above specified.

4. In a gun-mounting, the combination of an armored wall or shield having a port-hole or embrasure, a vertically-adjustable chassis upon which the gun slides longitudinally in its recoil and running-out movements, and guides having segmental or arc-shaped surfaces, whereby the said chassis when adjusted for vertical pointing or elevation is caused to turn about an imaginary or virtual pivot or axis in the said port-hole or embrasure, substantially as and for the purposes above specified.

5. In a gun-mounting, the combination, with a chassis or gun-slide, of guides therefor having segmental or arc-shaped surfaces, whereby the said chassis or slide when adjusted for vertical pointing or elevation is caused to turn about an imaginary or virtual pivot or axis, segmental racks secured to the said chassis or gun-slide and concentric with the guiding-surfaces, and bevel-wheels geared with the said rack and provided with means for rotating them to turn the said chassis or slide about the said imaginary or virtual pivot, substantially as and for the purposes above specified.

6. In a gun-mounting, the combination, with a chassis or gun-slide and segmental or arc-shaped guiding-surfaces, whereby the said chassis or slide when adjusted for vertical pointing or elevation is caused to turn about an imaginary or virtual pivot or axis, of another chassis or gun-slide guided by similar segmental or arc-shaped surfaces, whereby this chassis or slide when adjusted for vertical pointing or elevation is caused to turn about a prolongation of the said imaginary or virtual pivot or axis, and elevating-gear, whereby the said chassis or gun-slides are connected, so that they equilibrate or counterbalance each other, and when one is raised the other will be lowered, and vice versa, and whereby the said gun-slides are turned about their imaginary or virtual pivots or axes, respectively, substantially as and for the purposes above specified.

7. In a gun-mounting, the combination, with a chassis or gun-slide and segmental or arc-shaped guiding-surfaces, whereby the said chassis or slide when adjusted for vertical pointing or elevation is caused to turn about an imaginary or virtual pivot or axis, of another chassis or gun-slide guided by similar segmental or arc-shaped surfaces, whereby this chassis or slide when adjusted for vertical pointing or elevation is caused to turn about a prolongation of the said imaginary or virtual pivot or axis, segmental racks attached to the chassis or gun-slides and concentric with the guiding-surfaces, shafts arranged between the said slides and working one within the other, bevel-wheels fixed upon the said shafts and geared with the said racks, and a locking device or clutch whereby the said shafts may be connected and disconnected, substantially as and for the purposes set forth.

8. The combination of the rotating platform or turn-table, the segmental or arc-shaped guides attached thereto, and a vertically-adjustable chassis upon which the gun slides longitudinally in its recoil and running-out movements, said chassis being adjustable in the said guides about an imaginary or virtual pivot or axis, substantially as and for the purposes set forth.

9. The combination, with the rotating platform or turn-table and a chassis or gun-slide supported thereon, of a chamber beneath the said platform or turn-table, in which the gunners can stand while working the gun and which is secured to and rotatable with the said platform or turn-table, for the purpose above specified.

10. The combination of the rotating platform, the segmental or arc-shaped guides carried thereby, a chassis or gun-slide adjustable in the said guides about an imaginary or virtual pivot or axis, and a chamber beneath the said platform or turn-table, in which the gunners can stand while working the gun and which is secured to and rotatable with the said platform or turn-table, substantially as and for the purposes set forth.

11. The combination of a rotating platform or turn-table, a chassis or slide supported thereon, a gun arranged to recoil on the said chassis or slide, an armored shield above the turn-table, a chamber secured to the under side of the said turn-table and in which the gunner can stand while working the gun, and an armored wall surrounding the said turn-table and the chamber beneath it, for the purposes above specified.

In testimony whereof I have hereunto signed my name in the presence of two subscribing witnesses.

JEAN BAPTISTE GUSTAVE ADOLPHE CANET.

Witnesses:
   R. J. PRESTON,
   JOHN H. R. WHINFIELD.